United States Patent
Lange et al.

(10) Patent No.: US 7,054,731 B1
(45) Date of Patent: May 30, 2006

(54) FARM IMPLEMENT GUIDANCE METHOD AND APPARATUS

(75) Inventors: Arthur F. Lange, Sunnyvale, CA (US); Timothy J. Funk, San Jose, CA (US)

(73) Assignee: Trimble Navigation Limited, Sunnyvale, CA (US)

( * ) Notice: Subject to any disclaimer, the term of this patent is extended or adjusted under 35 U.S.C. 154(b) by 202 days.

(21) Appl. No.: 10/652,454

(22) Filed: Aug. 29, 2003

(51) Int. Cl.
*G06F 19/00* (2006.01)

(52) U.S. Cl. .......................... 701/50; 701/26; 701/213; 172/4.5

(58) Field of Classification Search ........... 342/357.17; 172/446, 4.5, 98; 701/26, 50
See application file for complete search history.

(56) References Cited

U.S. PATENT DOCUMENTS

| | | | |
|---|---|---|---|
| 5,471,391 A | 11/1995 | Gudat et al. | 364/424.07 |
| 5,974,348 A | 10/1999 | Rocks | 701/28 |
| 5,991,694 A | 11/1999 | Gudat et al. | 702/2 |
| 6,070,673 A | 6/2000 | Wendt | 172/2 |
| 6,073,070 A | 6/2000 | Diekhaus | 701/50 |
| 6,088,644 A | 7/2000 | Brandt et al. | 701/50 |
| 6,199,000 B1 | 3/2001 | Keller et al. | 701/50 |
| 6,272,405 B1 | 8/2001 | Kubota | 701/2 |
| 6,336,066 B1 | 1/2002 | Pellenc et al. | 701/50 |
| 6,434,462 B1* | 8/2002 | Bevly et al. | 701/50 |
| 6,470,265 B1 | 10/2002 | Tanaka | 701/208 |
| 6,501,422 B1 | 12/2002 | Nichols | 342/357.02 |
| 6,522,948 B1 | 2/2003 | Benneweis | 700/243 |
| 6,553,311 B1 | 4/2003 | Ahearn et al. | 701/213 |
| 6,553,312 B1 | 4/2003 | Upadhyaya et al. | 701/213 |
| 6,804,587 B1* | 10/2004 | O Connor et al. | 701/26 |
| 6,865,465 B1* | 3/2005 | McClure | 701/50 |
| 2002/0072850 A1 | 6/2002 | McClure et al. | |
| 2003/0208311 A1 | 11/2003 | McClure et al. | |
| 2004/0111202 A1* | 6/2004 | Mailer | 701/50 |
| 2004/0210357 A1 | 10/2004 | McKay et al. | |

FOREIGN PATENT DOCUMENTS

WO  WO 02/080652 A1  10/2002

OTHER PUBLICATIONS

Orthman Manufacturing, Inc., Lexington, Nebraska, agricultural and industrial products, www.orthman.com, Jul. 15-19, 2003.
Sukup Manufacturing Company, Sheffield, Iowa, grain handling products, www.sukup.com, Jul. 15-19, 2003.

* cited by examiner

*Primary Examiner*—Thomas G. Black
*Assistant Examiner*—Christine M. Behncke
(74) *Attorney, Agent, or Firm*—Menlo Patent Agency LLC

(57) ABSTRACT

An apparatus and method using GPS for dynamically adjusting side-to-side positioning of a farm implement along a geographical path. The apparatus includes a global positioning system (GPS) antenna disposed on the farm implement, a GPS receiver coupled to the GPS antenna for determining a location of the GPS antenna, and a dual guidance computer for comparing the location to stored geographical coordinates of a desired path or providing a guide signal for offsetting the lateral position of an adjustable hitch or angling a wheel or ground rudder in a steerable implement for guiding the implement along the path; and a range extent signal for maintaining the offset of the hitch or steering angle of the implement within its dynamic range.

20 Claims, 6 Drawing Sheets

FARM IMPLEMENT GUIDANCE METHOD AND APPARATUS

BACKGROUND OF THE INVENTION

1. Field of the Invention

The invention relates generally to systems for guiding farm implements and more particularly to an apparatus and method using global positioning system (GPS) locations for dynamically adjusting a farm implement side-to-side to match a predetermined geographical path.

2. Description of the Prior Art

Several companies have developed farm guidance systems for close cultivation of crops. These systems are used to reduce the amount of herbicide that is needed to keep weeds out of the growing area. One such system uses a special form of three-point hitch that is allowed to move side-to-side to track drag wires or guide wheels which follow a row of plants. However, a limitation of the wire and wheel systems occurs when planting because there are no crops in the ground for the wires to follow and often there are no raised rows for the guide wheels. Recently many farmers have began using "no-till" operations on their fields. With no-till, the field will never have furrows for a guidance system.

Recent developments with the global position system (GPS) using real time kinematic (RTK) carrier phase or differential (DGPS) corrections have made it possible for farmers to map geographical locations within a field and then return to those locations with the accuracy that is required for cultivating and planting. Several farm guidance systems have been developed or proposed using RTK or DGPS based locations with an autopilot for steering a tractor.

However, there are limitations of existing GPS-based tractor autopilot guidance systems. First, most existing GPS-based autopilot systems operate by determining a GPS-based cross track error of the tractor and then applying a position correction to determine and correct the cross track error of the implement. Errors in the position correction can undermine the fundamental accuracy of the GPS system. More importantly, when a three-point hitch is used, the control system equations for the correction are complicated by the tendency of the implement to displace to the side opposite the direction that the tractor is steered as the tractor and implement pivot about the rear wheels of the tractor. This difficulty could be avoided with a pivoting hitch. However, the position correction would also need to track the pivot angles. Even if the position corrections could track the pivot angles, the implement would be difficult to use on a sideways sloping terrain.

Second, the weight and size of a tractor result in a slow response time for positioning a towed implement. However, it is desirable to have a fast response in order to propel the implement as fast as possible for a given acceptable cross track error.

Third, GPS-based autopilot systems are limited in a practical sense because there are a great variety of different models of tractors that have different steering requirements. Many of these tractors are very old or have steering systems that are very difficult to connect to a guidance system. Often an older tractor will require the design of a custom hydraulic controller for the tractor's power steering. The documentation for the tractor's steering system may not be available. After all is said and done the custom design may well cost more than the cost of a new tractor.

There is a need for a farming guidance system for dynamic lateral positioning of a farm implement along a geographical path where the system has a fast response time, does not require a position correction between the tractor and the implement, and does not rely on existing rows.

SUMMARY OF THE INVENTION

Briefly, the present invention includes a global positioning system (GPS) antenna mounting directly on a farm implement for receiving GPS signals; a GPS receiver coupled to the GPS antenna for determining a location of the GPS antenna; and a dual guidance computer for comparing the location to stored geographical coordinates of a desired path. The dual guidance computer provides a guide signal for offsetting the lateral position of an adjustable hitch or turning a steering angle within the implement for guiding the implement along the path; and a range extent signal for maintaining the offset or steering angle within its dynamic range.

In a first preferred embodiment, the present invention uses an adjustable hitch to connect the implement to a powered vehicle, such as a tractor, for towing or pushing the implement. The dual guidance computer provides a lateral or left-right guide signal for rapidly positioning the implement side-to-side with respect to the powered vehicle. The dual guidance computer also provides a range extent signal for the position offset of the hitch with respect to the dynamic range of the position offset. A pilot device in the powered vehicle uses the range extent signal for steering the powered vehicle with a relatively slow response for maintaining the position offset of the adjustable hitch within its left-right dynamic range. The pilot device may be an autopilot or a left-right position offset display used by a human operator of the powered vehicle.

In prior art, when the implement is directly and firmly attached to the tractor with a three-point hitch, the tractor has to be steered and moved so the implement is then dragged to the proper line, often resulting in a large delay in bringing the implement back on-line with the possibility of oversteering of the tractor and less accurate positioning of the implement. With the present invention, as a tractor is driving along pushing or towing an implement, and an off-line position error is detected, the implement can be quickly be brought on-line by moving the hitch with respect to the tractor.

In a second preferred embodiment, the present invention uses a pivoting hitch to connect the implement to the powered vehicle. The dual guidance computer provides a left-right guide signal to a steering device in the implement. The steering device may be a coulter having an adjustable angle acting as a rudder in the ground. The steering device uses the guide signal for adjusting its angle with respect to a center line of the implement. The dual guidance computer also provides a range extent signal to the pilot device for the angle of the steering device with respect to the maximum extent of the angle. The pilot device uses the range extent signal for steering the powered vehicle with a relatively slow response for maintaining the angle of the steering device in the implement within its maximum extent.

The embodiments of the present invention have several advantages over the existing art for guiding a farm implement along a path. In the present invention existing rows are not needed because GPS is used to determine geographical locations, a position correction between the powered vehicle and the farm implement is not needed because the GPS signals are received directly on the farm implement, it is not necessary to add or interface an autopilot for an existing powered vehicle, and the farm implement can be propelled along a precise path at a relatively rapid rate without a requirement for fast steering of the powered vehicle.

These and other objects and advantages of the present invention will no doubt become obvious to those of ordinary skill in the art after having read the following detailed description of the preferred embodiments which are illustrated in the various figures.

IN THE DRAWINGS

DETAILED DESCRIPTION OF THE PREFERRED EMBODIMENTS

Figure 1B:
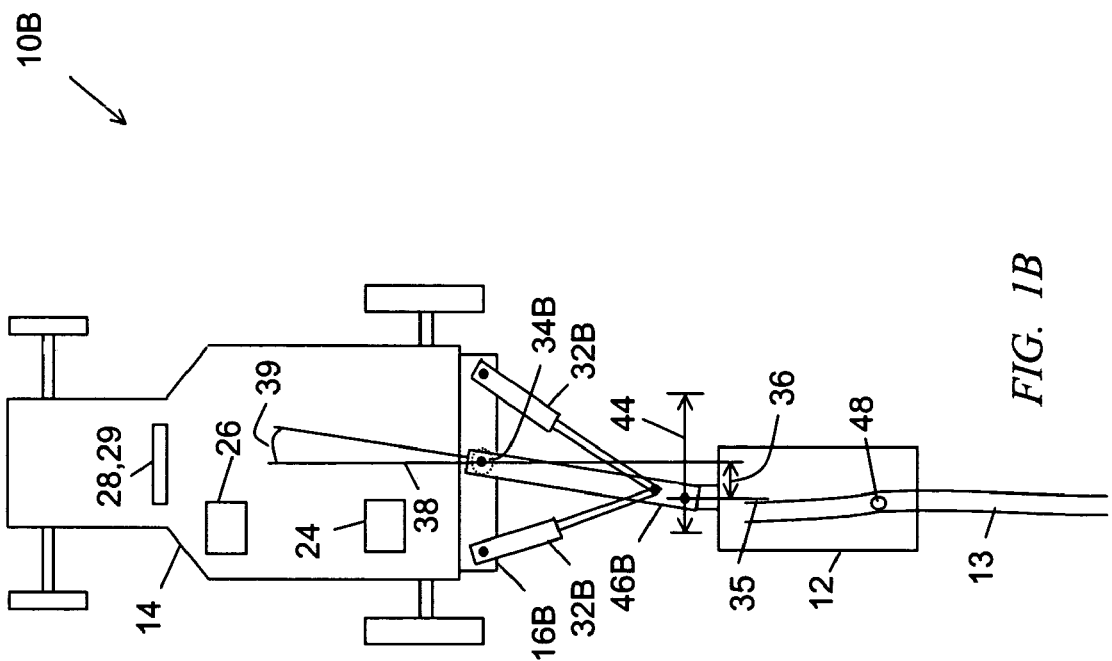
FIGS. 1A and 1B are block diagrams illustrating embodiments for apparatus' of the present invention for guiding a farm implement.
Figure 1A:
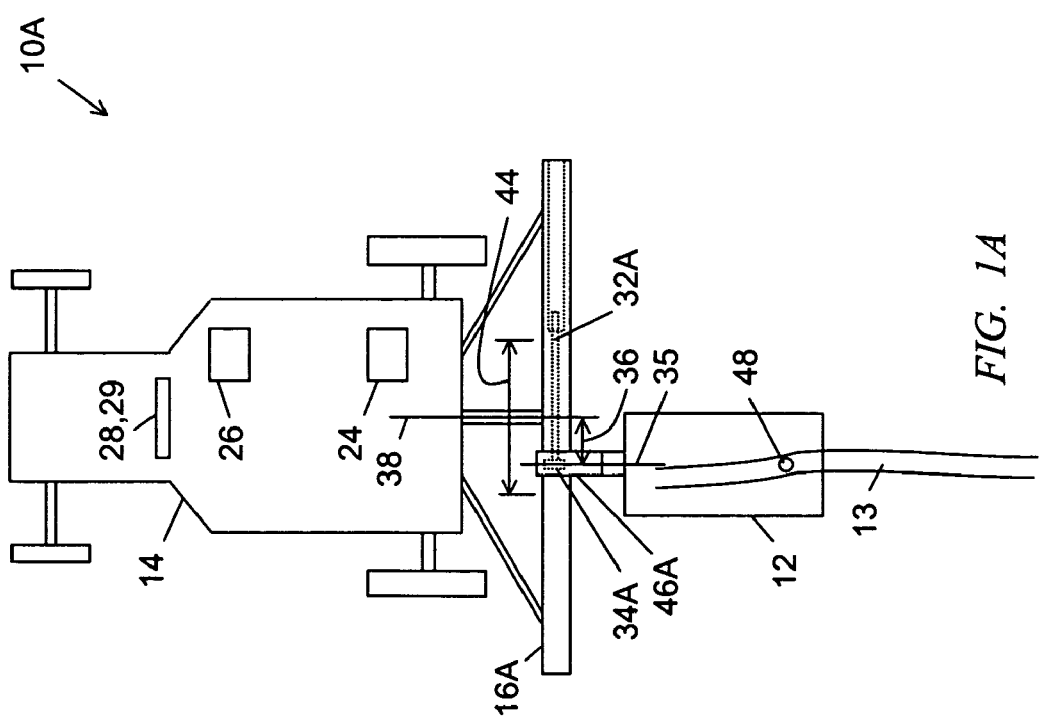

FIGS. 1A and 1B illustrate embodiments of a farming system of the present invention referred to with reference numbers 10A and 10B, respectively. It is an object of the system 10A,B to guide a farm implement 12 along a path 13 by dynamically adjusting the lateral or left-right position of the implement 12 with respect to a powered vehicle 14 that propels (tows, pulls, or side carries) the implement 12. The implement 12 can be a cultivator, planter, seeder, ripper, or the like.

Referring to FIG. 1A, the system 10A includes the farm implement 12, the powered vehicle 14, an adjustable hitch 16A, a global positioning system (GPS) receiver 24, a dual guidance computer 26, and a vehicle pilot device 28 or 29. The hitch 16A physically connects the implement 12 to the vehicle 14.

The hitch 16A includes an actuator 32A and a sensor 34A. The implement 12 has a center line 35. The actuator 32A physically positions the implement center line 35 to an adjustable left-right position offset 36 from a center line 38 of the vehicle 14. The sensor 34A senses the position of the adjustable position offset 36 with respect to a maximum position offset range 44 and provides an offset sense signal. In a preferred embodiment the actuator 32A is a hydraulic device or two hydraulic devices for pushing and pulling on a sliding tongue 46A of the hitch 16A that is connected with a tongue of the implement 12. Alternatively, the tongue 46A can be a part of the implement 12.

The farm implement 12 includes a GPS antenna 48 for receiving GPS signals from GPS satellites or pseudolites. The GPS antenna 48 converts airwave GPS signals to conducted GPS signals and passes the conducted GPS signals to the GPS receiver 24. The GPS receiver 24 uses the conducted GPS signals for determining a GPS-based geographical location of the point on the farm implement 12 where GPS antenna 48 is fixed. The GPS receiver 24 typically includes a radio transceiver for receiving real time kinematic (RTK) or differential GPS correction information and an RTK or DGPS computer using the GPS signals and the correction information for improving the accuracy of the location. The GPS receiver 24 and/or the dual guidance computer 26 can be disposed in the vehicle 14, the hitch 16A or the implement 12.

Referring to FIG. 1B, the system 10B includes the farm implement 12, the powered vehicle 14, the global positioning system (GPS) receiver 24, the dual guidance computer 26, the vehicle pilot device 28 or 29, and an adjustable hitch 16B. The hitch 16B physically connects the implement 12 to the vehicle 14.

The hitch 16B includes actuators 32B and a sensor 34B. The actuators 32B physically position the implement center line 35 to the adjustable left-right position offset 36 from the vehicle center line 38. The sensor 34B senses an angle 39 between the vehicle center line 38 and a center line of the tongue 46B for providing the offset sense signal. Either the sensor 34B or the dual guidance computer 26 the uses the geometries of the hitch 16B and/or the implement 12 for determining the lateral position of the adjustable position offset 36 with respect to the maximum position offset range 44. In a preferred embodiment the actuators 32B are dual hydraulic devices for pushing and pulling the tongue 46B of the hitch 16B in order to adjust the angle of the tongue 46B with respect to the center line 38. The tongue 46B is pivotally connected at the hitch 16B and the implement 12. Alternatively, the tongue 46B can be a part of the implement 12. The GPS receiver 24 and/or the dual guidance computer 26 can be disposed in the vehicle 14, the hitch 16B or the implement 12.

Figure 2:
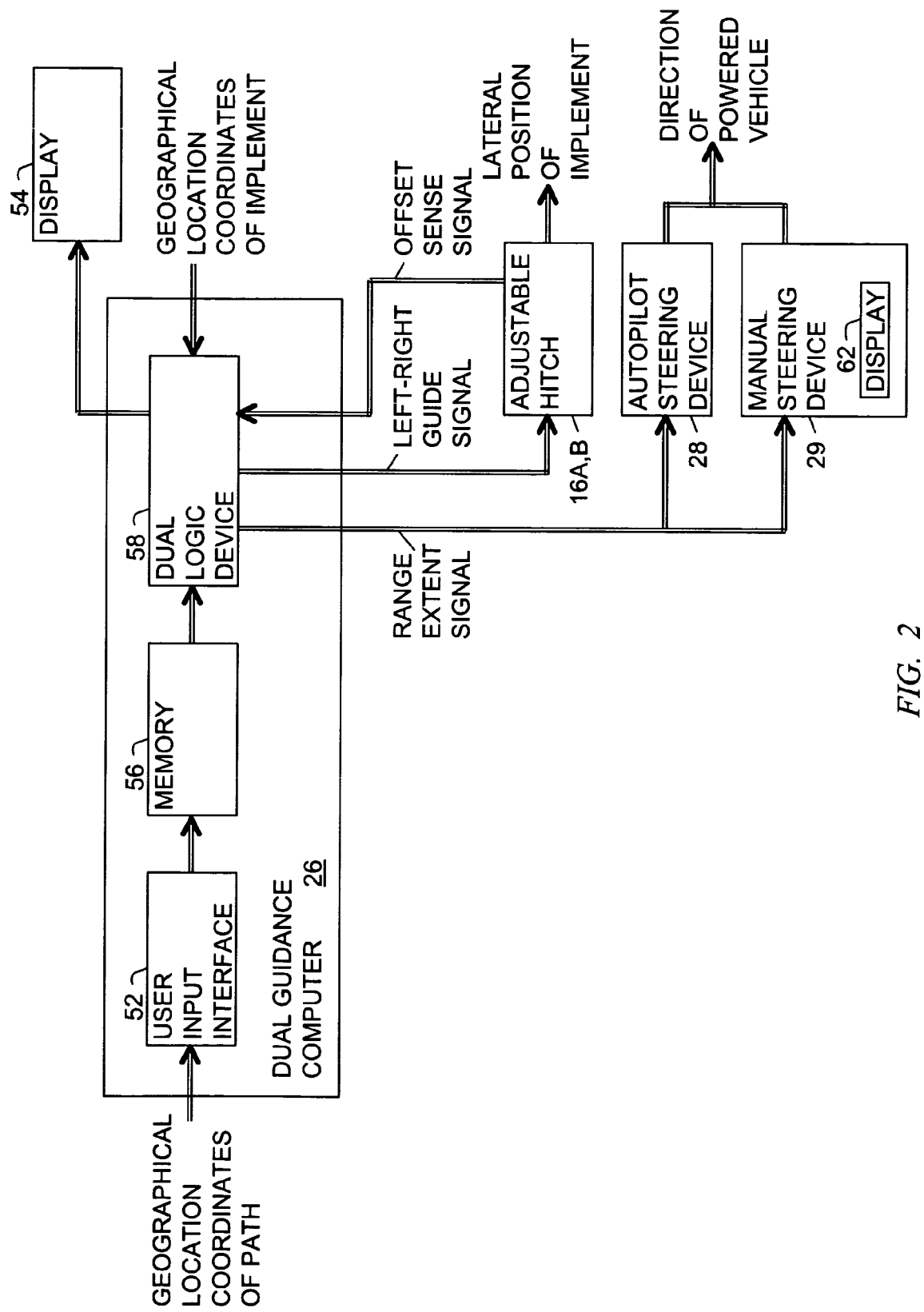
FIG. 2 is a block diagram of a dual guidance computer of the apparatus' of FIGS. 1A–B.

FIG. 2 is a block diagram of the dual guidance computer 26. The dual guidance computer 26 has the two functions of providing a left-right guide signal for positioning the adjustable hitch 16A,B side to side at a relatively rapid rate and providing a range extent signal used for steering the powered vehicle 12 at a relatively slow rate.

The dual guidance computer 26 includes a user input interface 52, a display 54, a memory 56, and a dual logic device 58. The memory 56 receives geographical coordinate information through the user input interface 52 for the path 13. The dual logic device 58 reads the geographical information for the path 13 from the memory 56 and then compares the path 13 to the GPS-based location of the implement 12 for determining a cross track error. A correction for the cross track error is then issued by the dual logic device 58 as the left-right guide signal to the adjustable hitch 16A,B. The adjustable hitch 16A,B uses the left-right guide signal to drive the actuators 32A,B. When the vehicle 14 is towing, pushing or side carrying the implement 12, the action of feedback from the comparison between the path 13 and the location of the implement 12 is fed back in the form of the left-right guide signal to the actuators 32A,B in order to guide the implement 12 to follow the path 13 as long as the position offset 36 is within the position offset range 44.

The dual logic device 58 receives information for the position offset 36 in a form that is related to the position offset dynamic range 44 in the offset sense signal from the sensor 34A,B. For example, the position offset 36 may be represented by a voltage of plus five volts to minus five volts where plus five volts represents the maximum extent of the position offset 36 in one direction and minus five volts represents the maximum extent of the position offset 36 in the other direction. The dual logic device 58 passes the information for the position offset 36 with respect to the position offset range 44 as a range extent signal to the vehicle pilot device 28,29. The pilot device 28,29 is used to make coarse relatively slow corrections in direction for maintaining the position offset 36 within its dynamic range 44. The pilot device 28 is an automatic steering device (autopilot) for steering the vehicle 14. The pilot device 29 uses the display 54 for showing a visual illustration 62 (FIG. 3) of the position offset 36 with respect to the maximum extents of the position offset range 44. A human operator uses the visual pilot representation 62 for steering the vehicle 14.

Figure 3:
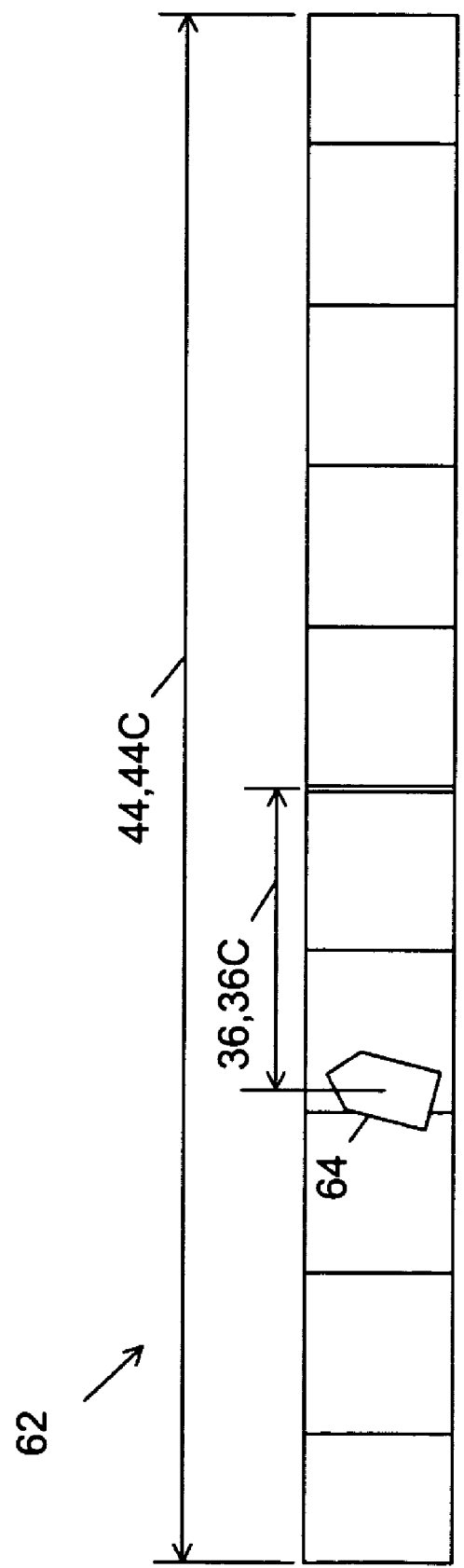
FIG. 3 is an illustration of a display for a steering device of the apparatus' of FIGS. 1A–B and 4.
Figure 4:
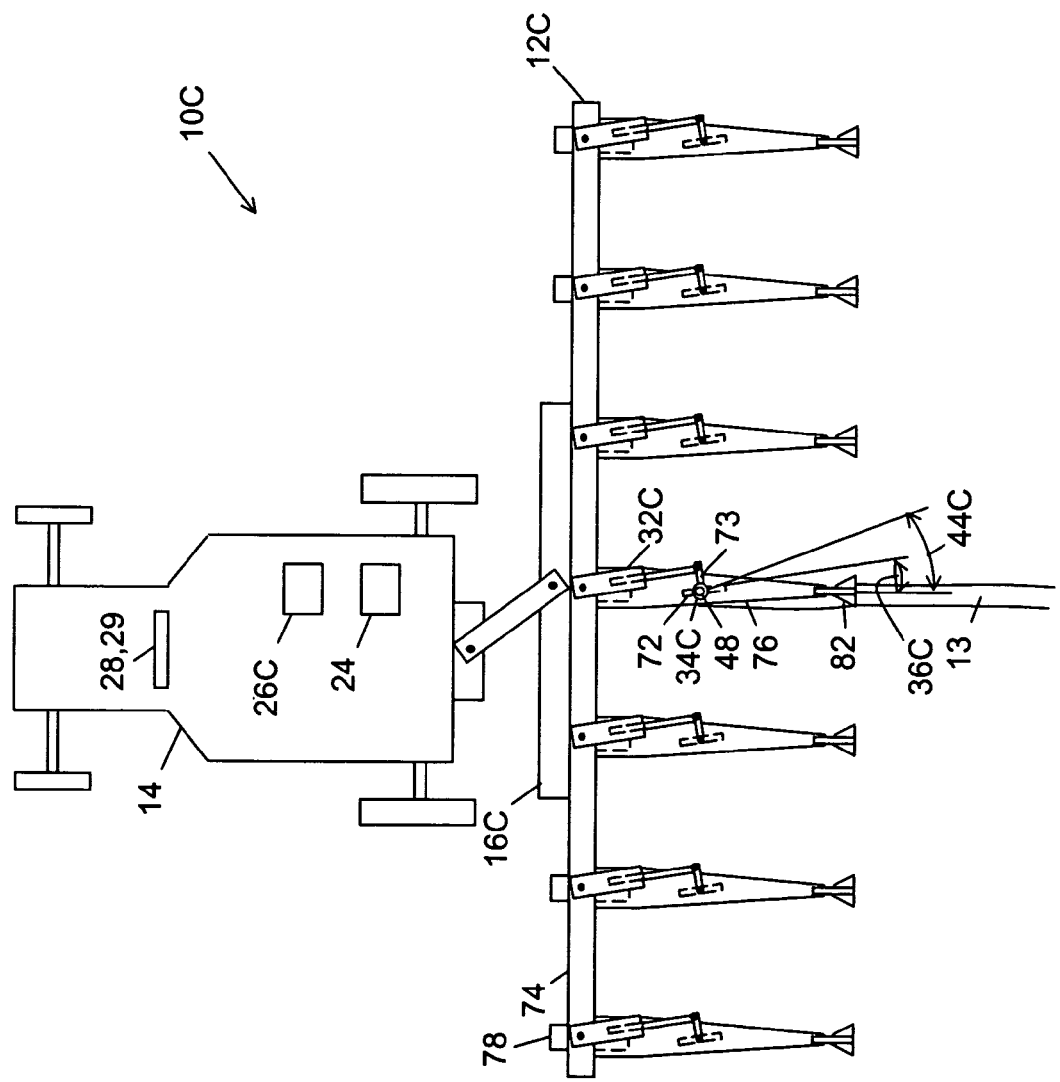
FIG. 4 is a block diagram illustrating another embodiment of an apparatus of the present invention.

FIG. 3 is a drawing of the visual pilot representation 62 for the vehicle pilot device 29. The visual pilot 62 shows the extent of the dynamic range 44 of the hitch 16A–B or maximum angle extent 44C of the implement 12C (FIG. 4); and an implement icon 64 showing the position offset 36 or steering angle 36C (FIG. 4). The visual pilot 62 also shows the direction of the implement 12 or 12C. The direction of the implement 12 or 12C may be determined by the GPS receiver 24 by measuring Doppler effects on the GPS signals received by the GPS antenna 48 or from successive GPS-based locations of the GPS antenna 48.

FIG. 4 illustrates an embodiment of a farming system of the present invention referred to with a reference number 10C. It is an object of the system 10C to guide a steerable farm implement 12C along a path 13 by dynamically steering the implement 12C with respect to the powered vehicle 14 that propels (tows, pulls or side carries) the implement 12C.

The system 10C includes the farm implement 12C, the powered vehicle 14, a pivoting hitch 16C, the global positioning system (GPS) receiver 24, a dual guidance computer 26C, and the vehicle pilot device 28 or 29. The hitch 16C physically connects the implement 12C to the vehicle 14. The hitch 16C may be left-right adjustable as described above for the hitches 16A or 16B for adjusting the position of the implement 12C laterally or may be fixed.

The implement 12C includes one or more left-right steering devices 72, one or more actuators 32C, and a sensor 34C. The actuators 32C use radius bars 73 to physically adjust a steering angle 36C of the steering devices 72 about a vertical axis in order to steer the implement 12C. The sensor 34C senses the steering angle 36C with respect to a maximum steering angle 44C for providing an angular offset sense signal. In a preferred embodiment the implement 12C is a cultivator and the steering devices 72 are coulters. The cultivator includes the coulters 72, a bar 74, chassis' 76, support wheels 78 and foot pieces 82. However, the implement 12C could equally well be a planter, seeder, harvester, picker, marker, ripper, or the like. When the steering devices 72 are coulters, the coulters act as rudders in the ground to steer the implement 12C in a manner that is analogous to the way that a rudder in the water steers a boat. However, the steering devices 72 can be support wheels, foot pieces, or other members that roll on or drag through the ground.

The farm implement 12C includes the GPS antenna 48 as described above for receiving GPS signals from GPS satellites or pseudolites. The GPS receiver 24 as described above uses the GPS signals received by the GPS antenna 48 for determining a GPS-based geographical location of the point on the farm implement 12C where GPS antenna 48 is fixed. The GPS receiver 24 and/or the dual guidance computer 26C can be disposed in the vehicle 14, the hitch 16C or the implement 12C.

The actuators 32A–C are illustrated and described in terms of hydraulic devices. However, it should be apparent to those skilled in the mechanical arts that the actuators 32A–C can also be implemented with other mechanical devices using motors, gears, chain drives, pulleys, wires, pneumatic devices, cranks, and the like.

Figure 5:
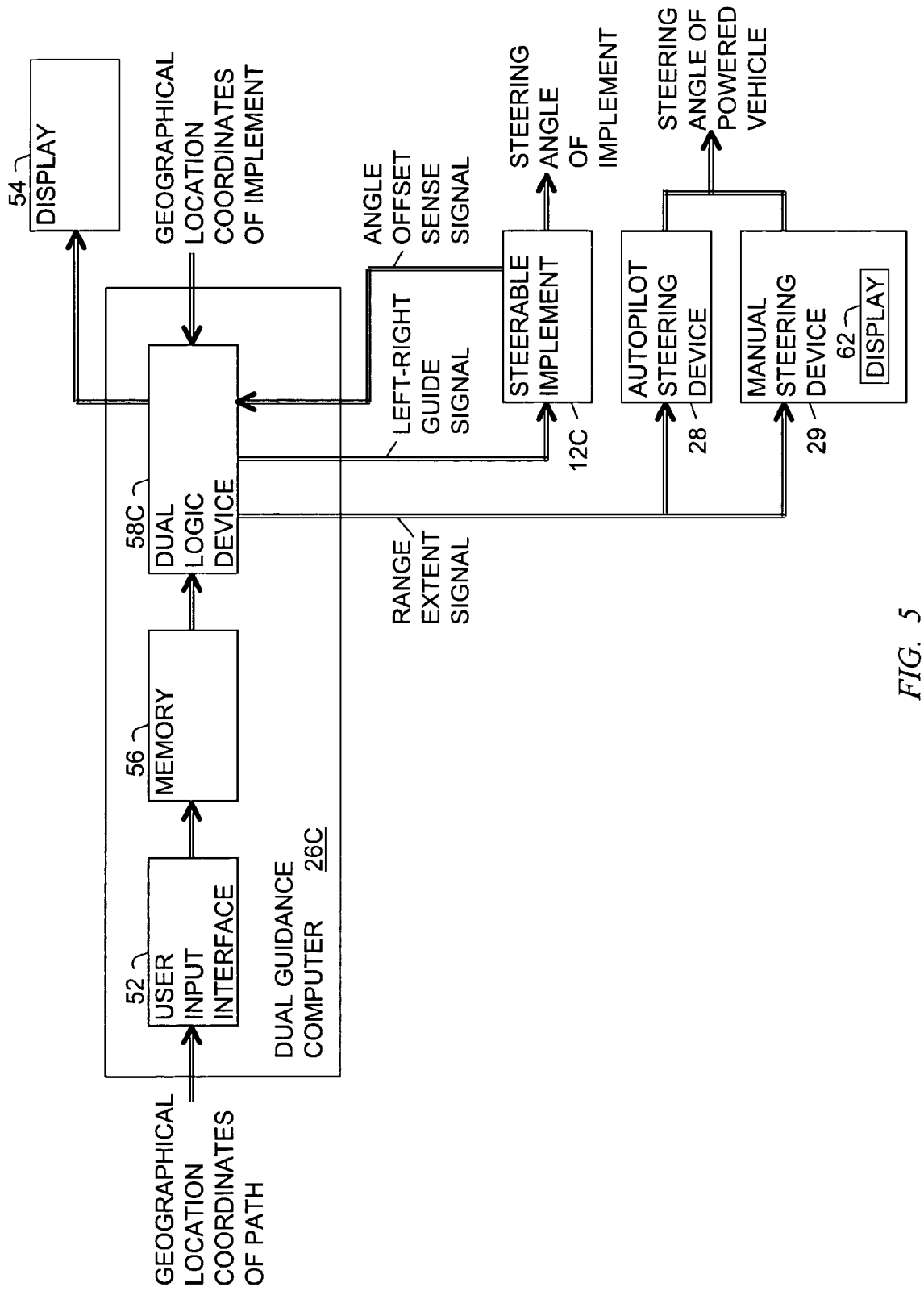
FIG. 5 is a block diagram of a dual guidance computer of the apparatus of FIG. 4.

FIG. 5 is a block diagram of the dual guidance computer 26C. The dual guidance computer 26C has the two functions of providing a left-right guide signal for steering the implement 12C side to side at a relatively rapid rate; and providing a range extent signal used for steering the powered vehicle 14 at a relatively slow rate.

The dual guidance computer 26C includes the user input interface 52, the display 54, the memory 56, and a dual logic device 58C. The memory 56 receives geographical coordinate information through the user input interface 52 for the path 13. The dual logic device 58C reads the geographical information for the path 13 from the memory 56 and then compares the path 13 to the GPS-based location of the implement 12C for determining a cross track error. A correction for the cross track error is then issued by the dual logic device 58C as the left-right guide signal to the steerable implement 12C. The steerable implement 12C uses the left-right guide signal to drive at least one of the actuators 32C. When the vehicle 14 is towing or pushing the implement 12C, the action of feedback from the comparison between the path 13 and the location of the implement 12C is fed back in the form of the left-right guide signal to the actuator(s) 32C in order to guide the implement 12C to follow the path 13 as long as the steering angle 36C is within the maximum steering angle 44C.

The dual logic device 58C receives information for the steering angle 36C in a form that is related to the maximum steering angle 44C in an angle offset sense signal. For example, the steering angle 36C may be represented by a voltage of plus five volts to minus five volts where plus five volts represents the maximum steering angle 44C in one direction and minus five volts represents the maximum extent of the maximum steering angle 44C in the other direction. The dual logic device 58C passes the information for the steering angle 36C with respect to the maximum steering angle 44C as the range extent signal to the pilot device 28,29. The pilot device 28,29 is used to make coarse relatively slow corrections in direction for maintaining the steering angle 36C within the dynamic range of the maximum steering angle 44C. The pilot device 28 is an automatic steering device (autopilot) for steering the vehicle 14. The pilot device 29 uses the display 54 for showing the visual pilot representation 62 of the steering angle 36C with respect to the maximum extents 44C of the of the steering angle. A human operator uses the visual pilot 62 for steering the vehicle 14.

Figure 6A:
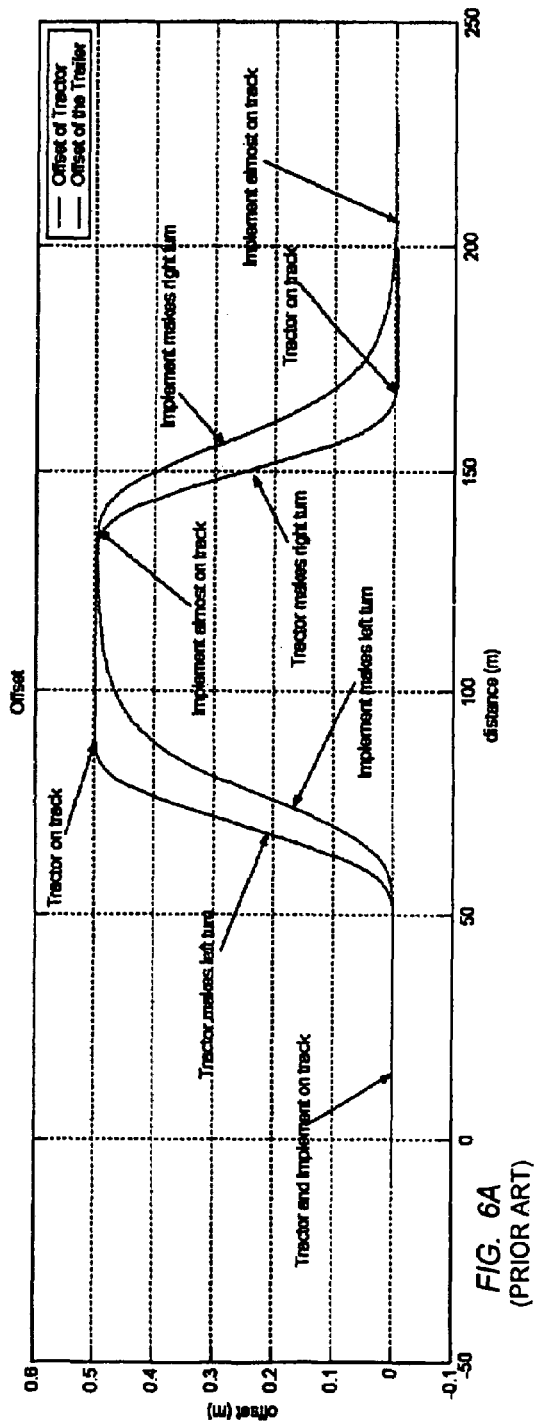
FIGS. 6A and 6B show offset and heading, respectively, for a farm implement guidance system of the prior art.
Figure 6B:
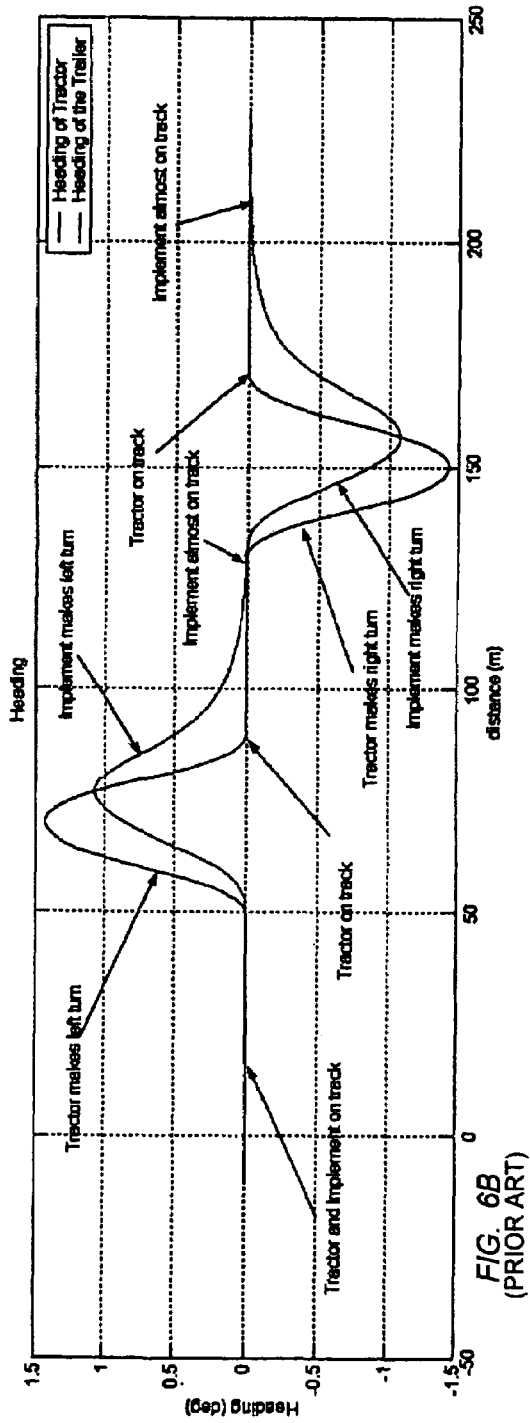

FIGS. 6A and 6B are offset and heading charts, respectively, showing simulated offset and heading for a farm implement guidance system of the prior art where a tractor is steered to position the implement (trailer). For the simulation, a boom length for the implement is chosen to be ten meters long attached to the rear axle of the tractor. Some implements may have shorter booms. However, a boom this long may be required for a wide implement. The tractor is assumed to have front steering and rear traction with a wheel base between front and rear axles of four meters. Two meters/second is used for the rear axle speed.

The tractor and implement travel on a track along an x-axis (horizontal axis on the offset and heading charts) from before 0 meters to after 200 meters. When the implement and the tractor have traveled about 50 meters, the tractor begins a left turn. The tractor settles to a cross track offset on the y-axis (vertical axis on the offset and heading charts) of 0.5 meters at about 90 meters on the x-axis (40 meters of travel distance after the left turn). The tractor stays at that cross track offset for about 40 meters. During this time, the implement is trailing the tractor. At about 130 meters the implement has still not fully settled. At that point, the tractor begins a right turn to come back to the original track at 0 meters on the y-axis. The tractor is fully on the original track at about 170 meters (again about 40 meters of travel distance after the turn). The implement again trails the tractor and settles at about 210 meters along the x-axis. The total distance for the tractor to settle for a lateral offset of 0.5 meters is about 40 meters=170 meters−130 meters or about 20 seconds at 2 meters/second. However, the total distance for the implement to settle is about 90 meters=210 meters−130 meters or about 45 seconds at 2 meters/second.

The farming system 10C of the present invention includes the ground rudder or wheeled steerable implement 12C. Other things being equal, when the implement 12C itself is steered with comparable performance to the tractor of the prior art guidance system, the implement 12C would have settled as fast as the tractor at about 40 meters or 20 seconds at 2 meters/second. In other words the farming system 10C corrects the location of the implement 12C in about 40/90 or less than one-half the time or distance that is required by the prior art guidance system of steering the tractor.

The farming system 10A,B of the present invention includes the lateral adjustment hitch 16A,B. In the above simulation the tractor wheels were turned left at a steady rate for 10 seconds, then back to straight-forward, then right, and then back to straightforward again. Each re-positioning of the tractor wheels takes 10 seconds. Other things being equal, if the hydraulics of the tractor can re-position the wheels in 10 seconds, the actuator 32A,B of the hitch 16A,B can re-position the implement 12A,B laterally in about the same time. Essentially in the prior art guidance system the driver of the tractor turns the tractor steering wheels to the left to start turning to the left. Then he straightens the wheels to the right initiating a right turn. Just before he gets onto the desired path, he steers to the left to straighten the tractor wheels. In the simulation, each of these actions take 10 seconds. Instead, if the tractor driver would command the actuator 32A,B of the hitch 16A,B, it would take about that much time to re-position the implement 12A,B. In other words, the farming system 10A,B corrects the location of the implement 16A,B in about 10/45 or less than one-quarter the time or distance that is required by the prior art guidance system of steering the tractor.

In general, although the present invention has been described in terms of the presently preferred embodiments, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. An apparatus for guiding a farm implement propelled by a powered vehicle, comprising:
   a global positioning system (GPS) antenna disposed on said implement for receiving GPS signals;
   a GPS receiver coupled to the GPS antenna for determining a location of the GPS antenna; and
   a dual guidance computer for issuing a left-right guide signal based upon a comparison between said location and a predetermined geographical path and issuing a range extent signal indicative of a left-right position offset between said implement and said powered vehicle of an adjustable hitch with respect to a dynamic range of said position offset; wherein:
   said adjustable hitch is adapted for using said guide signal for adjusting said position offset of said farm implement in relation to said powered vehicle for dynamically positioning said farm implement on said geographical path while said powered vehicle is steered according to said range extent signal for maintaining said position offset within said dynamic range.

2. The apparatus of claim 1, wherein:
   said powered vehicle includes an autopilot for steering according to said range extent signal.

3. The apparatus of claim 1, wherein:
   said powered vehicle includes a display using said range extent signal for indicating said position offset with respect to said dynamic range in a form that is visually perceptible to a human user.

4. The apparatus of claim 1, wherein:
   said position offset is adjusted rapidly with respect to relatively slow steering of said powered vehicle.

5. An apparatus for guiding a farm implement propelled by a powered vehicle, comprising:
   a global positioning system (GPS) antenna disposed on said farm implement for receiving GPS signals;
   a GPS receiver coupled to the GPS antenna for determining a geographical location of the GPS antenna; and
   a dual guidance computer for issuing a left-right guide signal based upon a comparison between said location and a predetermined geographical path and issuing a range extent signal indicative of a left-right steering angle between said implement and said powered vehicle of a steering device disposed in said implement with respect to a dynamic range of said steering angle; wherein:
   the implement includes said steering device for dynamically controlling said steering angle for directly steering said farm implement along said geographical path while said powered vehicle is steered according to said range extent signal for maintaining said steering angle within said dynamic range.

6. The apparatus of claim 5, wherein:
   said powered vehicle includes an autopilot for steering according to said range extent signal.

7. The apparatus of claim 5, wherein:
   said powered vehicle includes a display using said range extent signal for indicating said steering angle with respect to said dynamic range in a form that is visually perceptible to a human user.

8. The apparatus of claim 5, wherein:
   said steering device acts as rudder in the ground.

9. The apparatus of claim 5, wherein:
   said steering device is a coulter.

10. The apparatus of claim 5, wherein:
   said steering angle is adjusted rapidly with respect to relatively slow steering of said powered vehicle.

11. A method for guiding a farm implement, comprising:
   receiving global positioning system (GPS) signals with a GPS antenna disposed on said implement;
   determining a location of said GPS antenna from said GPS signals;
   propelling said implement with a powered vehicle, said implement connected to said powered vehicle at a left-right position offset between said implement and said powered vehicle;
   comparing said location to a predetermined geographical path for providing a left-right guide signal;
   dynamically adjusting said left-right position offset according to said guide signal;

sensing said position offset with respect to a dynamic range of said position offset for providing a range extent signal; and steering said powered vehicle according to said range extent signal for maintaining said position offset within said dynamic range.

12. The method of claim 11, wherein:

the step of steering includes steering said powered vehicle with an autopilot.

13. The method of claim 11, wherein:

the step of steering includes displaying said position offset with respect to said dynamic range in a form that is visually perceptible to a human user.

14. The method of claim 11, wherein:

the step of dynamically adjusting includes adjusting said position offset rapidly with respect to relatively slow steering of said powered vehicle.

15. A method for guiding a farm implement, comprising:

receiving global positioning system (GPS) signals with a GPS antenna disposed on said implement;

determining a geographical location of said GPS antenna from said GPS signals;

propelling said implement with a powered vehicle;

comparing said location to a predetermined geographical path for providing a left-right guide signal;

dynamically controlling a left-right steering angle between said implement and said powered vehicle of a steering device disposed in said implement for directly steering said implement according to said guide signal along said path;

sensing said steering angle with respect to a dynamic range of said steering angle for providing a range extent signal; and steering said powered vehicle according to said range extent signal for maintaining said steering angle within said dynamic range.

16. The method of claim 15, wherein:

the step of steering includes steering said powered vehicle with an autopilot.

17. The method of claim 15, wherein:

the step of steering includes displaying said steering angle with respect to said dynamic range in a form that is visually perceptible to a human user.

18. The method of claim 15, wherein:

said steering device acts as rudder in the ground.

19. The method of claim 15, wherein:

said steering device is a coulter.

20. The method of claim 15, wherein:

the step of dynamically controlling includes adjusting said steering angle relatively rapidly with respect to relatively slow steering of said powered vehicle.

* * * * *